United States Patent [19]

Hirai et al.

[11] Patent Number: 5,023,288
[45] Date of Patent: Jun. 11, 1991

[54] SILICONE RUBBER ADHESIVE

[75] Inventors: Kazuo Hirai; Akira Kasuya, both of Chiba, Japan

[73] Assignee: Toray Silicone Company, Ltd., Tokyo, Japan

[21] Appl. No.: 373,850

[22] Filed: Jun. 29, 1989

[30] Foreign Application Priority Data

Jul. 15, 1988 [JP] Japan .................................. 63-177887

[51] Int. Cl.$^5$ .............................................. C08K 5/54
[52] U.S. Cl. ..................................... 524/268; 524/366; 524/730; 524/731; 525/476; 525/478; 523/212
[58] Field of Search ............... 524/366, 268, 731, 730; 525/476, 478; 523/212

[56] References Cited

U.S. PATENT DOCUMENTS 4,800,124  1/1989  Davis et al. .......................... 524/268
4,918,126  4/1990  Matsushita et al. .................. 524/268

Primary Examiner—Melvyn I. Marquis
Attorney, Agent, or Firm—John L. Chiatalas

[57] ABSTRACT

The silicone rubber adhesive film of the present invention is characterized by simplicity of handling and an excellent workability and useablility, as well as by adhesiveness for various types of substrates and an excellent durability of adhesion. These characteristics are obtained because the silicone rubber adhesive film of the present invention comprises a silicone rubber composition which consists of components (A) through (G), particularly the specific wet-method hydrophobicized reinforcing silica comprising component (C) and the specific compounds of components (D) and (E) or components (D), (E), and (F), and because the tensile strength of said uncured silicone rubber composition falls within the range of 1.5 kg/cm$^2$ to 5.0 kg/cm$^2$ at 25 degrees Centigrade (JIS K 6301). Accordingly, when used on flat substrates such as textiles, glass, rubber sheet, etc., it can tightly bond the adhered partners into a single, integral body.

3 Claims, 1 Drawing Sheet

SILICONE RUBBER ADHESIVE

BACKGROUND OF THE INVENTION

The present invention relates to a silicone rubber adhesive.

Because silicone rubber adhisives have an excellent heat resistance, durability, weatherproofness, and so on, they are widely used in those applications which require such properties. However, silicone rubber adhesives take the form of mobile or fluid pastes, and, when they are to be applied on substrates which have a broad and flat surface, the corresponding coating operation can be time-consuming. It is also a problem to maintain a uniform coating thickness. In the realm of silicone rubber adhesives adapted to the bonding of such substrates, a roll-wound adhesive has been proposed in which a silicone rubber adhesive film is layered on a release substrate (Japanese Patent Application Laid Open [Kokai] Number 62225580 [225,580/87], at the back).

However, due to the low tensile strength of the uncured silicone rubber composition of this roll-wound adhesive, it is difficult to prepare in the form of thin films. Furthermore, its shape is subject to deformation during application, and, in order to prevent tearing, it must be handled at this point with the aid of the release substrate layer. These attributes serve to disadvantage the adhesion process. Finally, its adhesive performance is not entirely satisfactory.

SUMMARY OF THE INVENTION

The present inventors carried out extensive research directed at solving the aforementioned problems. It was discovered, as a result, that a silicone rubber composition prepared with the addition of a specific wet-method silica and specific compounds has excellent tensile strength in the uncured condition, can be prepared as a thin film, and, moreover, has an excellent adhesive performance. The present invention was achieved based on this finding.

The present invention takes as its object the introduction of a silicone rubber adhesive which can tightly bond various flat adherends, and particularly textiles, glass plates, rubber sheets, etc., into a single, unified structure, as realized through the introduction of a silicone rubber adhesive which is simple to handle, has an excellent workability, and also has an excellent and highly durable adhesiveness.

This invention relates to a silicone rubber adhesive comprising a silicone rubber composition having the following as its principal components: (A) 100 weight parts organopolysiloxane having at least two silicon-bonded alkenyl groups in each molecule, (B) organohydrogenpolysiloxane having at least two silicon-bonded hydrogen atoms in each molecule, in a quantity affording a value within the range of 0.5:1 to 5:1 for the molar ratio between the silicon-bonded hydrogen atoms in the instant component and the alkenyl groups in component (A), (C) 30 to 150 weight parts wet-method hydrophobicized reinforcing silica having a specific surface area of at least 200 m$^2$/g and constituted of the SiO$_2$ unit and organosiloxane units selected from the group comprising the R$_3$SiO$_{\frac{1}{2}}$ unit, R$_2$SiO unit, RSiO$_{3/2}$ unit, and their mixtures (R in each formula is a substituted or unsubstituted monovalent hydrocarbon group), with the proviso that the organosiloxane unit/SiO$_2$ unit molar ratio is 0.08 to 2.0, (D) 0.05 to 10 weight parts acryl-functional silane coupling agent or methacryl-functional silane coupling agent, (E) 0.05 to 10 weight parts epoxy-functional silane coupling agent, (F) 0 to 5 weight parts of the partial allyl ether of a multivalent alcohol, and (G) a platinum-type compound catalyst in a quantity sufficient to cause the curing of the composition of the present invention, wherein the tensile strength of said silicone rubber composition when uncured falls within the range of 1.5 kg/cm$^2$ to 5.0 kg/cm$^2$ at 25 degrees Centigrade.

Figure 1:
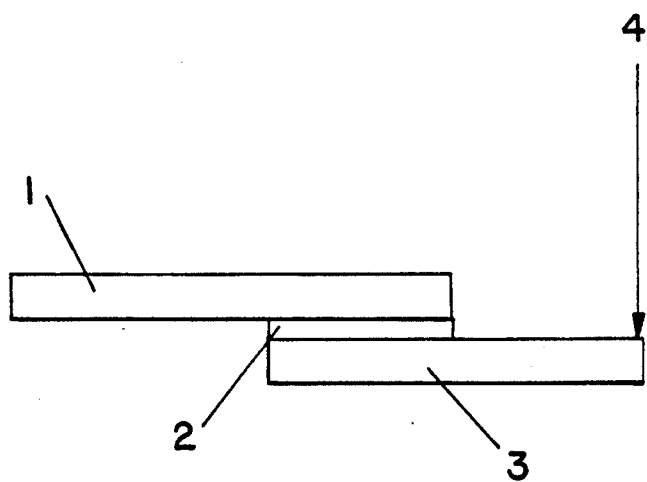
FIG. 1 is a side view of a test specimen for the determination of the adhesive strength of the adhesive of the present invention. (1) float-polished glass plate, (2) silicone rubber adhesive and (3) galvanized iron plate.

Reference numeral 1 designates a float-polished glass plate. Reference numeral 2 designates the silicone rubber adhesive to be tested. Reference numeral 3 designates a galvanized iron plate. The arrow designated by reference numeral 4 indicates the direction of the load.

DETAILED DESCRIPTION OF THE INVENTION

To explain the preceding in greater detail, organopolysiloxane component (A), the organopolysiloxane having at least two silicon-bonded alkenyl groups in each molecule, is the principal or main component of the composition of the present invention, and it cures by an addition reaction with component (B). The molecular structure of this component may be any of straight chain, branched, cyclic, network, or three-dimensional. Furthermore, while its molecular weight is not crucial, it is preferred that at least half of it be straight chain or branched and have a viscosity at 25 degrees Centigrade not exceeding 1,000,000 centipoise from the standpoints of facilitating mixing operations with the other components and ease of development of the adhesive properties.

The silicon-bonded alkenyl groups in component (A) are exemplified as follows: vinyl, allyl, propenyl, butenyl, pentenyl, hexenyl, heptenyl, octenyl, nonenyl, and decenyl. As far as the bonding position of the alkenyl group is concerned, it is preferred that it be at the opposite end from the silicon atom in order to obtain a better reactivity in the curing reaction. Other than alkenyl groups, the silicon-bonded organic groups are exemplified by alkyl groups such as methyl, ethyl, propyl, butyl, pentyl, and hexyl; aryl groups such as phenyl, tolyl, and xylyl; aralkyl groups such as benzyl and phenethyl; and halogenated alkyl groups such as trifluoropropyl and chloromethyl. Small quantities of the hydrogen atom, hydroxyl group, and alkoxy groups may be present among the silicon-bonded groups. From the standpoints of economics and a good adhesive performance, it is preferred that methyl comprise at least half of the number of silicon-bonded organic groups.

Organohydrogenpolysiloxane component (B), the organopolysiloxane having at least two silicon-bonded hydrogen atoms in each molecule, is a crosslinker for the composition of the present invention, and it brings about curing of the composition of the present invention through its reaction with component (A). Its molecular structure and molecular weight are not crucial. The silicon-bonded organic groups in this component are exemplified by the organic groups provided above for component (A), and it is preferred that the majority be methyl. This component is exemplified as follows:

trimethylsiloxy-terminated polymethylhydrogensiloxanes, trimethylsiloxy-terminated dimethylsiloxane-methylhydrogensiloxane copolymers, dimethylhydrogensiloxy-terminated polymethylhydrogensiloxanes, dimethylhydrogensiloxy-terminated polydimethylsiloxanes, dimethylhydrogensiloxy-terminated dimethylsiloxane-methylhydrogensiloxane copolymers, cyclic polymethylhydrogensiloxanes, cyclic dimethylsiloxane-methylhydrogensiloxane copolymers, tetrakis(dimethylhydrogensiloxy)silane, copolymers composed of $(CH_3)_2HSiO_{\frac{1}{2}}$ units, $(CH_3)_3SiO_{\frac{1}{2}}$ units, and $SiO_2$ units, and, copolymers composed of $(CH_3)_2HSiO_{\frac{1}{2}}$ units, $(CH_3)_3SiO_{\frac{1}{2}}$ units, $CH_3HSiO_{2/2}$ units, and $(CH_3)_2SiO$ units.

The component under consideration is added in a quantity such that the molar ratio between silicon-bonded hydrogen atoms in this component and alkenyl groups in component (A) has a value within the range of 0.5:1 to 5:1. Curing will be unsatisfactory at less than 0.5:1, while the cured material becomes too hard at greater than 5:1. It is preferred that this component be added in a quantity giving values of 0.8:1 to 3:1 for this ratio.

The wet-method hydrophobicized reinforcing silica component (C) used by the present invention is one essential component which distinguishes the present invention. It functions both to improve the tensile strength of the uncured silicone rubber adhesive of the present invention and to improve its adhesive performance.

This component (C) is a wet-method hydrophobicized reinforcing silica constituted of the $SiO_2$ unit and organosiloxane units selected from the group comprising the $R_3SiO_{\frac{1}{2}}$ unit, the $R_2SiO$ unit, the $RSiO_{3/2}$ unit, and their mixtures (each R is a substituted or unsubstituted monovalent hydrocarbon group, for example, alkyl groups such as methyl, ethyl, propyl, etc.; alkenyl groups such as vinyl, allyl, etc.; cycloalkyl groups such as cyclohexyl, etc.; aralkyl groups such as beta-phenylethyl, etc.; aryl groups such as phenyl, etc.; and halogenated alkyl groups such as 3,3,3-trifluoropropyl, etc.). The organosiloxane units are to be present in a quantity sufficient to hydrophobicize this reinforcing silica, and the molar ratio of organosiloxane units relative to the $SiO_2$ unit should fall within the range of 0.08 to 2.0 and preferably within the range of 0.08 to 1.5. When this molar ratio falls below 0.08, the adhesive performance is impaired, and plasticization reversion phenomena also tend to develop: an abnormal hardness and fissuring develop during long-term storage after preparation and the storage stability is impaired.

On the other hand, at values in excess of 2.0, the reinforcing properties suffer from such a precipitous decline that it can no longer perform as required of a reinforcing silica. Furthermore, with regard to its morphology, the specific surface area should be at least 200 $m^2/g$ and preferably at least 300 $m^2/g$ from the standpoint of increasing the mechanical strength of the ultimately obtained silicone rubber adhesive.

The component under consideration is to be added within the range of 30 to 150 weight parts and preferably within the range of 40 to 100 weight parts per 100 weight parts component (A).

This component (C) can be obtained, for example, according to the methods disclosed in Japanese patent publication No. 61-56255 [56,255/86] or U.S. Pat. No. 4,418,165.

The acryl-functional silane coupling agent or methacrylfunctional silane coupling agent comprising component (D) is an essential component which imparts adhesiveness to the adhesive of the present invention. This functional effect is substantially improved through its joint use with component (E) and also through its joint use with components (E) and (F).

Examples of component (D) are as follows:

3-methacryloxypropyltrimethoxysilane,
3-methacryloxypropyltriethoxysilane,
3-acryloxypropyltrimethoxysilane,
3-acryloxypropyltriethoxysilane,
methacryloxymethyltrimethoxysilane,
methacryloxymethyltriethoxysilane,
acryloxymethyltrimethoxysilane, and
acryloxymethyltriethoxysilane.

This component is to be added at 0.05 to 10 weight parts and preferably at 0.1 to 3 weight parts per 100 weight parts component (A).

The epoxy-functional silane coupling agent component (E) is an essential component which, like component (D), imparts adhesiveness to the adhesive of the present invention. This functional effect is substantially improved through its joint use with component (D) and also through its joint use with components (D) and (F).

This component is exemplified as follows:

3-glycidoxypropyltrimethoxysilane,
3-glycidoxypropyltriethoxysilane,
2-(3,4-epoxycyclohexyl)ethyltrimethoxysilane, and
2-(3,4-epoxycyclohexyl)ethyltriethoxysilane.

The partial allyl ether of a multivalent alcohol component (F), while not an essential component, functions to impart tack to the uncured adhesive of the present invention and also functions, through its joint use with components (D) and (E), to improve the durability of adhesion for various substrates by the adhesive of the present invention. This component is to be added at 0 to 1.5 weight parts and preferably at 0.01 to 2 weight parts per 100 weight parts component (A).

Concrete examples of this component are as follows: ethylene glycol monoallyl ether, glycerol monoallyl ether, glycerol diallyl ether, diglycerol monoallyl ether, diglycerol diallyl ether, diglycerol triallyl ether, trimethylolpropane monoallyl ether, trimethylolpropane diallyl ether, pentaerythritol monoallyl ether, pentaerythritol diallyl ehter, and pentaerythritol triallyl ether.

The platinum-type compound catalyst component (G) is a catalyst which cures the adhesive of the present invention. It encompasses platinum metals such as platinum, rhodium, and palladium as well as their compounds. Specific examples in this regard are platinum/asbestos, platinum/carbon, chloroplatinic acid and its alcohol solutions, platinum/olefin complexes, platinum/alkenylsiloxane compleses, and platinum/phosphine complexes. The quantity of addition of this component is not critical, but it is preferably added in a quantity which provides 0.1 ppm to 100 ppm platinum or platinum metal relative to component (A).

The silicone rubber composition used by the present invention is obtained by blending the above components (A), (B), (C), (D), (E), and (G) or components (A)

through (G) in their respectively specified quantities and mixing/kneading with, for example, a two-roll mill, kneader, Banbury mixer, or the like. Furthermore, as long as the object of the invention is not impaired, it is also permissible to add the various additives known to the art, for example, heat stabilizers such as titanium oxide, iron oxide red, cerium oxide, and barium zirconate; flame retardants such as halogen compounds and antimony oxide; and physical property improvers such as silanes or polysiloxanes.

It is essential with regard to the present invention that the tensile strength of the uncured silicone rubber composition fall with the range of 1.5 kg/cm$^2$ to 5.0 kg/cm$^2$ at 25 degrees Centigrade, and values of 2.0 kg/cm$^2$ to 4.0 kg/cm$^2$ are preferred. When the tensile strength falls below 1.5 kg/cm$^2$, tearing and shape deformation during handling begin to appear.

On the other hand, at values in excess of 5.0 kg/cm$^2$, while the handling is in fact simple and easy, plasticization reversion again appears in the silicone rubber composition during storage: there is a tendency for it to become excessively hard, to suffer from a loss of plasticity, and for fissuring to occur.

The tensile strength of the uncured silicone rubber composition as discussed in the present invention is the value measured according to Japanese Industrial Standard (JIS) K 6301.

It is important with regard to the present invention that the thickness of the silicone rubber adhesive film be uniform. It is preferred that this thickness value fall within the range of 0.01 to 10 mm, and thicknesses of 0.05 to 5 mm are even more preferred. At thicknesses less than 0.01 mm, forming the silicone rubber composition into a film tends to be troublesome. The silicone rubber adhesive becomes too thick at values in excess of 10 mm, and problems begin to appear after curing, such as a decline in adhesive strength due to stress concentration at the adhesion interface, a large creep, etc.

The adhesive of the present invention is readily prepared by extruding the above-described silicone rubber composition as a film from an extruder equipped with a die having the specified dimensions. Or, the silicone rubber composition can be formed into a film using a calendar roll and taken off.

At the point of actual use of the adhesive of the present invention, it will be advantageous to use the adhesive stamped out or punched out into a shape in conformity with the region of the substrate which is to be bonded. For example, two types of adherends can be bonded into a single structure as follows: the adhesive, punched out into the shape of the region of the substrate which is to be bonded, is placed on the corresponding surface of the substrate, the other substrate is then overlaid on this assembly, and thermal curing is subsequently carried out under pressure (1 to 20 kg/cm$^2$).

EXAMPLES

The present invention is explained in greater detail by the following illustrative examples.

In the examples, parts=weight parts and %=weight %. The tensile strength of the uncured silicone rubber composition and the adhesiveness were measured as follows.

MEASUREMENT OF THE TENSILE STRENGTH OF THE UNCURED SILICONE RUBBER COMPOSITION

The silicone rubber composition was molded into a 2-mm thick sheet using a 2-roll mill, and a number 3 dumbbell, as stipulated in JIS K 6301 (Physical Testing Methods for Vulcanized Rubber), was punched from this sheet molding. The tensile strenght of this dumbbell was then measured according to the method stipulated in JIS K 6301.

This measurement was conducted at 25 degrees Centigrade.

MEASUREMENT OF ADHESIVE STRENGTH

The silicone rubber adhesive was inserted between a float-polished glass plate (0.5 mm×50 mm×50 mm) and a galvanized iron plate (0.5 mm×24 mm×50 mm), and a test specimen was obtained in which edge zones of the glass plate and galvanized iron plate were bonded via the silicone rubber adhesive into a single, integral body, as illustrated in FIG. 1, by thermal curing at a pressure of 13 kg/cm$^2$ and a temperature of 130 degrees Centigrade/30 minutes using a manual press. After immobilizing the nonbonded region of the glass plate of the test specimen, the iron plate was separated from the glass plate by applying a load downward along the vertical at a position 10 mm from the edge of the nonbonded region of the iron plate. The tensile strength of the silicone rubber adhesive was calculated from the load at the time of separation of the iron and glass plates.

A tensile tester (TENSILON from Toyo Baldwin Kabushiki Kaisha) was used in these measurements, and the loading rate was 50 mm/minute.

REFERENCE EXAMPLE 1

Synthesis of Wet-method Hydrophobicized Reinforcing Silica

Hydrophobing agent was first synthesized according to the method described in Japanese Patent Publication No. 61-56255.

Thus, 277 g octamethylcyclotetrasiloxane, 4.6 g 1,3,5,7-tetramethyl-1,3,5,7-tetravinylsiloxane, 517 g methyltrimethoxysilane, and 0.43 g potassim hydroxide as catalyst were reacted for approximately 2 hours at 105 degrees Centigrade to prepare a hydrophobing agent comprising ring-opened redistributed organopolysiloxane. The potassium hydroxide was neutralized with carbon dioxide. Analysis of the obtained organopolysiloxane confirmed it to be a linear organopolysiloxane containing 0.7 mole% methylvinylsiloxy groups.

Using this hydrophobing agent, wet-method hydrophobicized reinforcing silica was synthesized as follows.

118 g methanol, 32 g concentrated aqueous ammonium hydroxide, and 39 g of the hydrophobing agent prepared above were placed in a glass reactor and mixed to homogeneity using an electromagnetic stirrer. Then, while this mixture was vigorously stirred, 96 g methyl orthosilicate was added at once. The reaction product gelled after 15 seconds and stopped the stirrer. It was then sealed in this form and aged by standing for 1 week at room temperature to afford a suspension of wet-method hydrophobicized reinforcing silica.

The methanol and ammonia gas were removed from this silica suspension, and the BET surface area was measured on the obtained wet-method hydrophobicized reinforcing silica: it was confirmed to a wet-method hydrophobicized reinforcing silica having a specific surface area of 540 m²/g.

EXAMPLE 1

300 Parts of the wet-method hydrophobicized reinforcing silica suspension (silica content=25%) as prepared in Reference Example 1 was added in a kneader mixer to 100 parts dimethylvinylsiloxy-terminated dimethylsiloxane-methylvinylsiloxane copolymer gum (composed of dimethylsiloxane units and methylvinylsiloxane units, vinyl content=0.14 mole%). This was heated to 90 degrees Centigrade and mixed while removing the solvent. The volatiles were completely removed by additionally heating with mixing for 90 minutes at 180 degrees Centigrade, thus to give a silicone rubber base. To prepare a base compound, the following were mixed to homogeneity into 100 parts of this silicone rubber base: 2.0 parts trimethylsiloxy-terminated methylhydrogensiloxane-dimethylsiloxane copolymer (viscosity at 25 degrees Centigrade=7 centistokes, silicon-bonded hydrogen atom content=1.5 weight%), chloroplatinic acid/methylvinylsiloxane complex in a quantity sufficient to give 10 ppm as platinum, and 100 ppm methyltris (methylisobutynoxy) silane as curing inhibitor. 0.5 parts gamma-glycidoxypropyltrimethoxysilane, and 0.3 parts glycerol monoallyl ether were added to 100 parts of this base compound, followed by mixing and kneading to homogeneity to give a silicone rubber composition. The tensile strength of this silicone rubber composition was measured, and values of 3.0 to 3.5 kg/cm² were found.

A silicone rubber adhesive film was obtained by sheeting this silicone rubber composition on a two-roll mill and cutting this to a size of thickness=0.6 mm, width=24 mm, and length=25 mm.

This silicone rubber adhesive was used to prepare test specimens according to the above-described adhesive strength measurement method. The adhesive strength was determined directly on this test specimen and on such a test specimen which had been maintained for 2 days in water at 100 degrees Centigrade. The obtained measurement values are reported in Table 1.

For comparison, a silicone rubber composition was obtained as above but without the addition of gamma-methacryloxypropyltrimethoxysilane, and a silicone rubber adhesive was prepared as above but without the addition of the gamma-glycidoxypropyltrimethoxysilane. The adhesive strength was measured on these as above, and these results are reported in Table 1 as Comparison Example 1 and Comparison Example 2, respectively.

TABLE 1

| Item Measured | Present Invention | Comparison Example 1 | Comparison Example 2 |
|---|---|---|---|
| Adhesive strength of untreated test specimen in kg/60 mm² | 58 | 25 | 34 |
| Adhesive strength of test specimen after immersion in hot water in kg/60 mm² | 42 | 19 | 17 |

EXAMPLE 2

A silicone rubber adhesive was prepared as in Example 1, but without the addition of the glycerol monoallyl ether of Example 1, and its adhesive strength was measured as in Example 1. These results are reported in Table 2.

For comparison, a silicone rubber adhesive (Comparison Example 3) was prepared as in Example 1, with the exception that neither the glycerol monoallyl ether nor the gamma-methacryloxypropyltrimethoxysilane of Example 1 were added. Its adhesive strength was measured as in Example 1, and these results are also reported in Table 2.

TABLE 2

| Item Measured | Present Invention | Comparison Example 3 |
|---|---|---|
| Adhesive strength of untreated test specimen in kg/60 mm² | 56 | 21 |
| Adhesive strength of test specimen after immersion in hot water in kg/60 mm² | 28 | 18 |

That which is claimed is:

1. A silicone rubber adhesive composition comprising:
   (A) 100 weight parts of an organopolysiloxane having at least two silicon-bonded alkenyl groups in each molecule,
   (B) an organohydrogenpolysiloxane having at least two silicon-bonded hydrogen atoms in each molecule, in a quantity affording a value within the range of 0.5:1 to 5:1 for the molar ratio between the silicon-bonded hydrogen atoms in the instant component and the alkenyl groups in component (A),
   (C) 30 to 150 weight parts of reinforcing silica which has been hydrophobicized by a wet-method, said silica having a specific surface area of at least 200 m²/g and constituted of the SiO₂ unit and organosiloxane units selected from the group consisting essentially of the $R_3SiO_{\frac{1}{2}}$ unit, $R_2SiO$ unit, $RSiO_{3/2}$ unit, and their mixtures wherein R in each formula is a substituted or unsubstituted monovalent hydrocarbon group, with the proviso that the organosiloxane unit/SiO₂ unit molar ratio is 0.08 to 2.0,
   (D) 0.05 to 10 weight parts of a silane coupling agent selected from the group consisting of acryl-functional silane coupling agents and methacryl-functional silane coupling agents,
   (E) 0.05 to 10 weight parts of an epoxy-functional silane coupling agent,
   (F) 0 to 5 weight parts of the partial allyl ether of a multivalent alcohol, and
   (G) a platinum compound catalyst in a quantity sufficient to cause the curing of the composition of the present invention, wherein the tensile strength of said silicone rubber composition when uncured falls within the range of 1.5 kg/cm² to 5.0 kg/cm² at 25 degrees Centigrade.

2. A silicone rubber adhesive as claimed in claim 1 in which the epoxy-functional silane coupling agent is 3-glycidoxypropyltrimethoxysilane.

3. A silicone rubber adhesive as claimed in claim 1 in which the partial allyl ether of a multivalent alcohol is the monoallyl ether of glycerol.

* * * * *